UNITED STATES PATENT OFFICE.

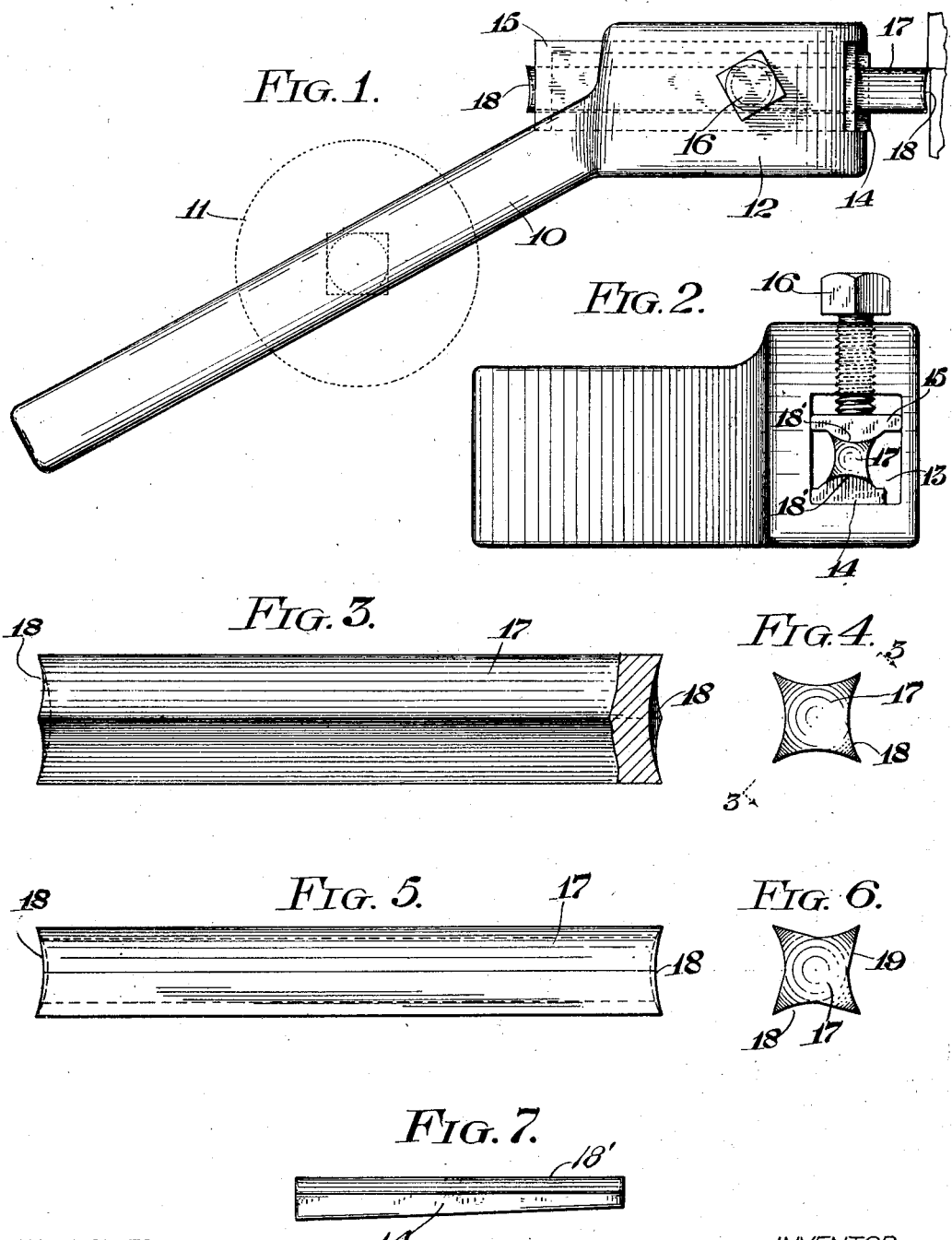

SPENCER F. HALL, OF RACINE, WISCONSIN, ASSIGNOR OF ONE-HALF TO WALTER C. PALMER, OF RACINE, WISCONSIN.

TOOL AND TOOL-HOLDER.

1,361,851.  Specification of Letters Patent.  Patented Dec. 14, 1920.

Application filed January 6, 1919.  Serial No. 269,938.

*To all whom it may concern:*

Be it known that I, SPENCER F. HALL, a citizen of the United States, and resident of Racine, Racine county, Wisconsin, have invented new and useful Improvements in Tools and Tool-Holders, of which the following is a description, reference being had to the accompanying drawings, which are a part of this specification.

This invention has for its object to provide a tool and tool holder for use on lathes, planers, and the like which will economize in the use of tool steel and permit of readjustment to subject several cutting edges to wear before requiring resharpening.

Another object of the invention is to provide a tool which may be of uniform cross section from end to end so as to be adapted to constitute a rolling mill product.

Another object of the invention is to provide such a tool with a tool holder capable of being readily adjusted for either right hand or left hand feed.

With the above and other objects in view, the invention consists in the tool and tool holder as herein claimed, and all equivalents.

Referring to the accompanying drawings, in which like characters of reference indicate the same parts in different views:

Figure 1 is a plan view of a tool holder with tool constructed in accordance with this invention;

Fig. 2 is an end view thereof;

Fig. 3 is a view of the tool removed and partly sectioned;

Fig. 4 is an end view thereof with the sectional plane of Fig. 3 indicated by lines 3—3;

Fig. 5 is a side view of a tool of modified construction;

Fig. 6 is an end view thereof; and

Fig. 7 is a detail view of a tapering tool seat block.

In these drawings 10 indicates a tool holder provided with a shank adapted to be clamped in an ordinary tool post 11 and having an obliquely positioned head 12 through which a rectangular opening 13 extends. Within the opening 13 are a pair of clamping blocks 14 and 15, the block 14 being narrower than the opening and resting on the bottom thereof and capable of being shifted laterally thereon against one side or the other of the opening. The block 15 is of a width to have a sliding fit against both of the side walls of the opening and is engaged by a set screw 16 threaded through the tool holder head and serving to force the block 15 toward the block 14 to clamp the tool therebetween.

The tool of this invention consists of a bar 17 of tool steel of the same cross section from end to end with concave opposite faces so that the corners form sharp cutting edges. In order that the concave faces of the tool bar 17 may fit the engaging faces of the blocks 14 and 15, rounded beads or bearing surfaces 18' are formed on the blocks extending lengthwise thereof. These beads are preferably of the same radius as the curvature of the concave faces of the tool bar but are of greater width than the width of the faces of the tool bar so that the tool bar may be engaged in different positions thereon according to whether the block 14 is at the left of the opening 13, as shown in Fig. 2, or at the right thereof. At one or both ends the tool bar is sharpened by grinding a spherically convex end face 18 therein so that four cutting points of equal length are produced at the four edges.

In operation the tool bar is inclined to the right or left according to the direction it is to be fed by giving it a twist while the set screw 16 is slack, thus causing it to slide on the rounded surface of the upper block 15 and cause the lower block 14 to shift from one side of the opening 13 to the other. The tool bar is also extended by sliding it longitudinally between the blocks to the desired degree and the set screw is then tightened, clamping all parts firmly in their adjusted positions. This inclination of the tool enables one upper edge to constitute the cutting edge farther in advance than the lower edge on the same side so that the lower edge is not dulled by engagement with the work. The tool holder is also set at a slight angle with relation to the work to prevent the other two cutting edges of the tool from contacting with the work. When the cutting edge becomes dulled it is not necessary to re-sharpen at once, but the tool is released and turned a quarter turn to bring the next cutting edge into operative position. This readjustment may be repeated until all four of the cutting edges at one end or all eight of the cutting edges at both ends of the tool bar have been used. Resharpening may then be done by holding the ends of the tool against a spherical grinder. The tool may be repeatedly sharpened in this manner as it is of the same cross section from end to end, thus giving a maximum amount of use for the weight of tool steel employed. The tool bars may be economically manufactured without waste of material by forming them between rollers in the ordinary rolling mill.

It is obvious that the invention is not limited to a tool bar of the sectional form shown in Fig. 4 but that variations may be made in this shape without departing from the invention. For instance, the construction shown in Figs. 5 and 6 may be used, which differs from the other in that each cutting edge is reinforced by a straight wall 19 directly beneath it when in its operative position. This gives greater strength to the cutting edges without materially adding to the weight of the tool bar. It will thus be seen that the convex or grooved faces of the tool bar may be formed by straight surfaces as well as curved surfaces.

It is found in actual operation that a tool constructed in accordance with this invention is a great convenience, saving time and labor, and that incidentally there is an avoidance of the formation of annoying and dangerous long curling shavings usually produced when making a heavy cut, the curvature or inclined surface of the upper cutter tooth not in action serving as a chip breaker to bend and break the shaving in short pieces as soon as it leaves the work.

It is obvious that the lower block 14 may be made of the same thickness from end to end to give the tool bar a horizontal position or it may be thicker at one end than at the other as in Fig. 7 so that the tool bar may be directed downwardly or upwardly according to the position in which the block is placed in the tool holder.

What I claim as new and desire to secure by Letters Patent is:

1. In combination, a tool bar having a number of similar faces forming corner cutter points at the end, and a holder for clamping the tool bar with any of its faces uppermost so that the several cutting points may be successively held in operative position.

2. In combination, a tool bar of a generally angular sectional shape from end to end with its faces concave, and a tool holder for clamping the tool bar with any face uppermost.

3. In combination, a tool bar of the same sectional shape from end to end, such sectional shape being generally angular with the faces concave, and a tool holder having convex clamping faces to fit against the opposite concave faces of the tool bar.

4. In combination, a tool bar having a sectional shape generally angular with concave opposite faces, and a tool holder having opposite convex bearing surfaces for engaging opposite concave surfaces of the tool bar, one of said convex surfaces of the tool holder being shiftable laterally.

5. In combination, a tool bar having oppositely positioned longitudinally extending grooves, and a tool holder having a pair of co-acting clamping blocks with convex projections to fit the grooves of the tool bar, one of the clamping blocks being shiftable laterally.

6. In combination, a tool bar of uniform section with concave faces, and a tool holder having an opening therethrough, a set screw threaded through the tool holder and projecting into the opening, and a pair of clamping blocks in the opening provided with convex projections to fit opposite concave faces of the tool bar, one of the clamping blocks fitting in the opening of the tool holder and engaged by the set screw and the other clamping block being narrower than the opening and shiftable laterally therein.

7. A cutting tool, comprising a bar of uniform section with concave side faces, and a spherically concave end forming similar cutting teeth at the corners of said end.

8. A cutting tool, comprising a tool bar of uniform section with side faces cylindrically concave and with one end spherically concave to form similar cutting teeth at the corners of said end.

In testimony whereof I affix my signature in presence of two witnesses.

SPENCER F. HALL.

Witnesses:
 WALTER C. PALMER,
 BESSIE JANDL.